United States Patent
Overbeek et al.

(10) Patent No.: US 9,228,096 B2
(45) Date of Patent: Jan. 5, 2016

(54) RADIATION CURABLE COMPOSITION

(71) Applicant: DSM IP ASSETS B.V., Heerlen (NL)

(72) Inventors: Gerardus Cornelis Overbeek, Waalwijk (NL); Alfred Jean Paul Bückmann, Waalwij (NL); Michael Arnoldus Jacobus Schellekens, Waalwijk (NL); Jacobus Willem Griffioen, Waalwijk (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 14/159,607

(22) Filed: Jan. 21, 2014

(65) Prior Publication Data
US 2014/0134337 A1    May 15, 2014

Related U.S. Application Data

(63) Continuation of application No. 13/856,696, filed on Apr. 4, 2013, which is a continuation of application No. 13/588,555, filed on Aug. 17, 2012, now abandoned, which is a continuation of application No. 13/295,700, filed on Nov. 14, 2011, now abandoned, which is a continuation of application No. 12/097,665, filed as application No. PCT/EP2006/011764 on Dec. 7, 2006, now abandoned.

(30) Foreign Application Priority Data

Dec. 20, 2005 (EP) ..................... 05112487

(51) Int. Cl.
C09J 175/08 (2006.01)
C09D 175/04 (2006.01)
C09J 175/04 (2006.01)
C09D 11/101 (2014.01)
C09D 11/102 (2014.01)
C09D 175/16 (2006.01)
C08L 75/08 (2006.01)

(52) U.S. Cl.
CPC ............... *C09D 11/102* (2013.01); *C08L 75/08* (2013.01); *C09D 11/101* (2013.01); *C09D 175/04* (2013.01); *C09D 175/16* (2013.01); *C09J 175/04* (2013.01); *C09J 175/08* (2013.01)

(58) Field of Classification Search
CPC .. C09D 11/102; C09D 175/04; C09D 175/16; C09D 11/101; C09J 175/04; C09J 175/08; C08L 75/08
See application file for complete search history.

(56) References Cited

U.S. PATENT DOCUMENTS

| 4,057,431 A | 11/1977 | Finelli et al. |
| 4,228,232 A | 10/1980 | Rousseau |
| 4,590,144 A | 5/1986 | Schornick et al. |
| 4,606,994 A | 8/1986 | Illers et al. |
| 4,607,084 A | 8/1986 | Morris |
| 5,061,605 A | 10/1991 | Kawamura et al. |
| 5,290,663 A | 3/1994 | Huynh-Tran |
| 5,360,835 A | 11/1994 | Sato et al. |
| 5,840,823 A | 11/1998 | Licht et al. |
| 5,945,473 A | 8/1999 | Kielbania et al. |
| 6,335,397 B1 | 1/2002 | Kokel et al. |
| 2005/0192400 A1 | 9/2005 | Killilea et al. |
| 2008/0081871 A1 * | 4/2008 | Sehgal et al. ............ 524/591 |

FOREIGN PATENT DOCUMENTS

| EP | 0 040 923 | 12/1981 |
| EP | 0 241 027 | 10/1987 |
| GB | 1 564 542 | 4/1980 |

OTHER PUBLICATIONS

Evaporation Rate of Sovlents Technical Data Sheet from Siegwerk. (Apr. 2008). onilne. Retrieved from internet on Jan. 26, 2015. Retrieved from Internet <URLhttp://www.siegwerk.com/fileadmin/user_upload/cc/Data_Sheets/TM/Verdunstungsgeschwindigkeit_e.pdf>.*
International Search Report for PCT/EP2006/011764, mailed May 23, 2007.
Written Opinion of the International Searching Authority for PCT/EP2006/011764, mailed May 23, 2007.
International Preliminary Report on Patentability for PCT/EP2006/011764, dated Apr. 18, 2008.

* cited by examiner

*Primary Examiner* — Sanza McClendon
(74) *Attorney, Agent, or Firm* — Nixon & Vanderhye P.C.

(57) ABSTRACT

A radiation curable composition comprising 15 to 85 wt % of at least one solvent comprising ≤20 wt % of water; 5 to 50 wt % of at least one radiation curable material having a Mn in the range of from 50 to 10,000 g/mol; and 10 to 70 wt % of at least one polyurethane having a Mw in the range of from 4,000 to 70,000 g/mol, the polyurethane having 0 to 5 wt % of isocyanate-reactive component(s) bearing ionic or potentially ionic water-dispersing groups and a free isocyanate group content ≤0.5 wt %.

14 Claims, No Drawings

RADIATION CURABLE COMPOSITION

This application is a continuation of commonly owned U.S. application Ser. No. 13/856,696, filed Apr. 4, 2013 (now abandoned) which is a continuation of U.S. application Ser. No. 13/588,555, filed Aug. 17, 2012 (now abandoned), which is a continuation of U.S. application Ser. No. 13/295,700, filed Nov. 14, 2011 (now abandoned), which is a continuation of U.S. application Ser. No. 12/097,665, filed Aug. 19, 2008 (now abandoned), which in turn is the national phase application under 35 USC §371 of PCT/EP/2006/011764, filed Dec. 7, 2006, which designated the U.S. and claims priority to EP Application No. 05112487.3, filed Dec. 20, 2005, the entire contents of each of which are hereby incorporated by reference.

The invention relates to a composition comprising at least one radiation curable material and at least one solvent borne polyurethane, an adhesive comprising the composition and an ink comprising the composition.

Such inks are suited for various printing techniques such as flexographic printing, gravure printing, and screen printing, and can be used in number of applications, including for example inks for flexible packaging substrates like paper, board and plastic as well as metallic foils for both surface printing and lamination applications.

Laminates are multi-layered composites where each layer consists of the same or different materials. In the field of flexible packaging, laminates usually comprise plastic and/or metallised films. Flexible packaging is used for example in the food industry and has many requirements such as for example eliminating or limiting the transfer of moisture, oxygen, oils and flavours; flexible packaging used for microwave cooking needs to protect the contents during storage but also needs to have good heat resistance; flexible packaging used for beverages needs to have good cold resistance and handling resistance; flexible packaging used in other applications may also need to be resistant to the transfer to perfumes, resistant to surfactants, resistant to oil/water mixtures, and additionally the flexible packaging should be easy to open when required.

Generally laminates are produced by joining two or more layers using adhesives or by carrying out adhesive-free extrusion coating. Additionally it is often desirable to apply an image to one or more of the layers during the lamination process.

For example, if using an adhesive laminating method an image may be printed onto a plastic film substrate, after which an adhesive is applied to the inked substrate, followed by applying a second film to the adhesive (the adhesive could also be applied to the second film). If using an extrusion coating/laminating method an image may be printed onto a plastic film substrate, optionally followed by the application of a primer and then a molten resin is extruded onto the inked substrate to form a second layer followed by the formation of a bond between the two substrates. It is therefore desirable that laminating inks possess excellent adhesion to the printing substrate as well as to the film adhesive and/or film to be laminated.

Laminated films, when used to make packaging, often undergo heat sealing and when used as food packaging must be able to undergo a boiling or retorting treatment for cooking or sterilising the contents. It is therefore also desirable that delamination does not occur during such processes.

The properties of a laminate therefore depend on the type of films used, the laminating process, the type of adhesive and the ink properties and in particular the properties of any resins used as binders in the ink.

The types of films that are used in flexible packaging laminates include amongst others: polyester, cellophane, polypropylene, polyethylene, aluminium foils, nylon and paper. Such films may also have been functionalised through a range of chemical and physical treatments.

A range of binders have been used in laminating inks such as modified PVC (polyvinyl chloride), polyvinyl butyral, polyamides, polyesters, nitrocellulose and both water- and solvent-based polyurethanes, acrylics and co-polymers thereof. However it has been found that some binders are incompatible, difficult to clean up from ink printing equipment and many only adhere to certain substrates and even if the binders do adhere, they may be poor in their resistance to boiling or retorting treatments and generally do not achieve desirable bond strength. In addition there is an increase in demand for high line speed printing, especially at line speeds greater than 200 m/min or even greater than 300 m/min. However, at such line speeds printability problems such as cob webbing may occur for flexo printing and scumming may appear for gravure printing processes. One cause of such problems is the limited resolubility, also called redispersibility, of the binders used in the inks in the typical solvents used in these applications. Resolubility is a property, well known to the printing industry, whereby dry or drying polymer obtained from an aqueous or solvent based polymer composition is redispersible or redissolvable in that same composition when the latter is applied thereto. Resolubility is defined in more detail below. Resolubility is of great importance in the process of printing which generally involves applying the ink-formulation by various cylinders (smooth, engraved or flexo diches); these can become blocked with polymer by evaporation of the liquid medium (solvent and/or water) and/or the ink formulation can dry on the roller surface (e.g. during a short stoppage of the process for one reason or another) and this would obviously create problems when the process is restarted if the polymer were not resoluble.

Although the use of solvents such as ketones or solvents with a slower evaporation rate may be used to solve some of the problems, these solvents have other inherent issues such as safety and environmental issues as well as being slow to dry which can result in the solvent migrating into the packed material. Therefore the use of solvents with a faster evaporation rate is useful, although if they are too fast then printability failures may also occur.

There are also concerns with chlorine being given of during the incineration of packaging printed with polyvinyl chloride based inks and polyvinyl butyral based inks are associated with printing difficulties.

A method for overcoming such problems is to use a combination of binders where binders may be chosen to suit particular films and adhesives. However a disadvantage with such an approach is that a large number of binders need to be prepared and stored for all the different types of inks that may be applied to the laminate films. Additionally if the various inks are not compatible with each other then extensive cleaning of the printing equipment would be required for each change over.

EP 0,338,791 discloses printing inks consisting of a water-in-oil emulsion including a radiation curable component. A disadvantage of having mainly a radiation curable component is that coatings may shrink on cure and there may be an odour and taint impact, as a result of possible migration of low molecular weight fractions. This migration may also lead to a taste impact when applied on a material which is used for food packaging.

EP 0,604,890 discloses a printing ink composition for a laminate containing a polyurethane resin. U.S. Pat. No. 6,642, 343 discloses the use of a polyurethane resin as a film forming binder in inks. WO 01/14442 discloses a polyurethane resin that may be used in formulating printing ink compositions. WO 02/38643 discloses solvent based poly(urethane/urea) resins suitable for formulating laminating printing inks.

A disadvantage of such polyurethanes is that they often still require combining with several other binders, especially hard binders to get a good balance of properties such as for example adhesion, block resistance, flexibility, solvent retention, chemical resistances and resistance to sterilisation.

The addition of a radiation curable material was found to give an improved balance of film properties. GB 1,564,542 discloses radiation curable, solvent-free coatings. U.S. Pat. No. 5,061,605 discloses a photopolymerisable compositions. EP 0,241,027 discloses an adhesive composition comprising a photopolymerisable compound and a free isocyanate compound. EP 0,040,923 discloses a radiation curable composition for an adhesive coating.

Surprisingly we have found that it is possible to prepare a combination of a polyurethane binder with a radiation curable material that may overcome many of the disadvantages of the prior art systems with a polyurethane system which is suitable for use as an adhesive or as an ink, especially as an ink for screen printing and for flexo and gravure printing processes on a broad range of substrates used in flexible packaging film laminates and which are suitable for extrusion lamination. Furthermore, compared to water-borne inks, which generally require the use of more hydrophilic i.e. water compatible binder or stabilisation materials, solvent based polyurethanes in combination with radiation curable materials may show improved chemical resistances which may be of importance for food packaging applications.

According to the present invention there is provided a radiation curable composition comprising:
(a) 15 to 85 wt % of at least one solvent comprising ≤20 wt % of water;
(b) 5 to 50 wt % of at least one radiation curable material having a Mn in the range of from 50 to 10,000 g/mol;
(c) 10 to 70 wt % of at least one polyurethane:
  (i) having a Mw in the range of from 4,000 to 70,000 g/mol;
  (ii) having 0 to 5 wt % of isocyanate-reactive component(s) bearing ionic or potentially ionic water-dispersing groups;
  (iii) having a free isocyanate group content ≤0.5 wt %; and
wherein (a), (b) and (c) add up to 100%.

Preferably the ratio of (b) to (c) is in the range of from 9/91 to 40/60 and most preferably from 14/86 to 35/65.

Preferably radiation curable includes UV curable and electron beam curable, most preferably radiation curable is UV curable.

Compared to laminating inks that are based on a higher Mw solvent borne polyurethane binder, the present invention offers an improved drying speed due to a higher attainable solids content and the combination of radiation curing and thermal drying which may result in higher line speeds being possible.

Preferably the composition of the invention comprises 15 to 80 wt % and most preferably 15 to 75 wt % of solvent (a).

Preferably the solvent (a) comprises ≥75 wt %, more preferably ≥90 wt %, most preferably ≥98 wt % and especially 100 wt % of fast evaporating solvents. Fast evaporating solvents are solvents having an evaporation rate of ≥1.0, more preferably ≥1.4 and most preferably ≥1.6. Values for evaporation rates were published by Texaco Chemical Company in a bulletin Solvent Data: Solvent Properties (1990). (The values given are relative to the evaporation rate (ER) of butyl acetate which is defined as 1.00). Determination of evaporation rates of solvents that are not listed the Texaco bulletin is as described in ASTM D3539.

Fast evaporating solvents are particularly useful where fast drying times are required, especially when printing onto hydrophobic and non-absorbent substrates, for example plastic, metal and glass.

The solvent (a) is preferably selected from the group consisting of alcohols (such as ethanol, isopropanol, n-butanol, n-propanol, cyclohexanol), esters (such as ethyl acetate, propyl acetate, isopropyl acetate, butyl acetate), aromatic solvents (such as toluene), ketone solvents (such as acetone, methyl ethyl ketone, methyl isobutyl ketone) cyclohexanone; diacetone alcohol; aliphatic hydrocarbons; chlorinated hydrocarbons (such as $CH_2Cl_2$); ethers (such as diethyl ether, tetrahydrofuran); and mixtures thereof. Most preferably at least 70 wt %, more preferably at least 85 wt % and especially more than 98 wt % of the solvent (a) comprises a solvent selected from the group comprising ethanol, isopropanol, ethylacetate and mixtures thereof. Preferably the solvent (a) comprises 10 wt % of water, more preferably ≤6 wt % and most preferably ≤1 wt % of water.

The radiation curable material of the invention composition may comprise one or more than one radiation curable material.

Preferably the radiation curable material (b) has a Mn in the range of from 220 and 7,000 g/mol more preferably 400 to 6,000 g/mol, most preferably 500 to 5,200 g/mol and especially 550 to 3,500 g/mol.

Mn (number average molecular weight) and Mw (weight average molecular weight) herein when measured, are measured by Gel Permeation Chromatography (GPC), using THF as a solvent and polystyrene standards i.e. g/mol based on polystyrene standards.

Preferably the radiation curable material is cured with a radical mechanism. The radiation curable material when cured by a radical mechanism may also be initiated with a thermal initiator instead of a photoinitiator or with both. Use of a thermal initiator is commonly referred to as thermal curing.

The radiation curable material may comprise a wide variety of monofunctional or multifunctional materials. Preferably the radiation curable material has one, preferably two or more radiation polymerisable ethylenically unsaturated bonds which are capable of polymerisation. Preferably the radiation curable material has an average acrylate functionality in the range of from 1 to 6, more preferably 2 to 6 and most preferably 2 to 5.

Typical examples of such materials include but are not limited to epoxy (meth)acrylates; polyester (meth)acrylates; urethane (meth)acrylates; silicon (meth)acrylates; acrylated acrylics; mono- and multi-functional (meth)acrylate monomers and amine-(meth)acrylate adducts.

At the lower molecular weight range of the radiation curable material, the radiation curable material preferably comprises one or more monofunctional or multifunctional (meth) acrylate monomers, or amine-(meth)acrylate adducts.

Examples of monofunctional radiation curable material are: phenoxyethyl acrylate (PEA), isobornyl(meth)acrylate (IBOA and IBOMA), isooctyl acrylate (IOA), octyl and decyl acrylate, isodecyl acrylate (IDA), (ethoxylated) nonylphenol acrylate (NPEA), ethoxyethoxyethyl acrylate (EEEA), dicyclopentyloxyethyl(meth)acrylate (DCPEA and DCPEMA), tetrahydrofurfuryl(meth)acrylate (THFA and THFMA), beta-carboxyethyl acrylate (BCEA), acrylic acid, caprolactone(meth)acrylate, alkoxylated(meth)acrylate, glycerol (meth)acrylate, N-vinylpyrolidone, N-vinylformamide, N-vinylcaprolactam, styrene, dimethylacrylamide and silane monomers. Multifunctional (meth)acrylate monomers are for example (meth)acrylic acid esters of di- and tri-hydroxyl alcohols (e.g. polyethylene glycol, polypropylene glycol, aliphatic diols, neopentyl glycol, ethoxylated bisphenol A, trimethylolpropane, pentaerythritol, glycerol, di-trimethylolpropane, hydroxyl functional polyesters, dipentaerythritol and the ethoxylated, propoxylated and polycaprolactone analogues of all the above). Preferably such multifunctional materials are substituted and unsubstituted (meth)acrylates. Preferred examples are: (alkoxylated) neopentyl glycol di(meth)acrylate (NPGDA), (alkoxylated) trimethylolpropane tri(meth)acrylate (TMPTA and TMPTMA), (alkoxylated) pentaerythritol tri(meth)acrylate and tetra(meth)acrylate (PETA), 1,4-butanediol di(meth)acrylate (BDDA and BDDMA), 1,6-hexanediol di(meth)acrylate (HDDA and HDDMA), 2,2-dimethyl-3-hydroxypropyl-2,2-dimethyl-3-hydroxypropionate di(meth)acrylate, triethylene glycol di(meth)acylate (TEGDA and TEGDMA), tripropylene glycol di(meth)acrylate (TPGDA and TPGDMA), glycerol propoxylate triacrylate (GPTA), alkoxylated bisphenol A diacrylate, polyethyleneglycol di(meth)acrylate (PEGDA and PEGDMA), dipentaerythritol pentaacrylate (DPEPA), and the like.

Amine-(meth)acrylate adducts are those products prepared by the partial "Michael Type Addition" of primary and secondary amines to ethylenic unsaturation i.e. the double bond of (meth)acrylate containing compounds. Of particular interest here are the multi-functional (meth)acrylate monomers as mentioned below. Examples of amine-acrylate adducts are diethylamine modified trimethylolpropane triacrylate and ethanolamine modified ethoxylated trimethylolpropane triacrylate.

Epoxy (meth)acrylates are products formed by the reaction of (meth)acrylic acid with an epoxy(glycidyl) functional component e.g. aliphatic and aromatic containing epoxy resins, epoxidised oils, acrylic polymers and acrylic grafted polymers in which the acrylic component contains pendent epoxy groups. Some of the (meth)acrylic acid may be replaced by other acids, both ethylenically unsaturated and saturated, so as to impart specific properties e.g. aliphatic acids, fatty acids and aromatic acids. These products may alternatively be prepared by the reaction of a carboxylic acid functional component (e.g. polyesters and acrylic polymers) with a second component containing both epoxy groups and ethylenic unsaturation e.g. glycidyl (meth)acrylate.

Urethane (meth)acrylates are those products formed by the reaction of an isocyanate containing component with a hydroxyl containing component. At least one of these components must contain ethylenic unsaturation. Examples of isocyanate functional components are hexamethylene diisocyanate, isophorone diisocyanate, isocyanate functional acrylic polymers and polyurethanes, reaction products of hydroxyl functional components (e.g. polyethylene glycol, polypropylene glycol and di-, tri- and etc-hydroxy aliphatic alcohols (e.g. glycerol and trimethylolpropane) and their ethoxylated, propoxylated and polycaprolactone analogs) with di-, tri- and etc-isocyanates (e.g. hexamethylene diisocyanate, isophorone diisocyanate and toluene diisocyanate). Examples of hydroxy containing ethylenically unsaturated components are hydroxyethyl(meth)acrylate and its ethoxylated, propoxylated and polycaprolactone analogs as well as (meth)acrylated polyester polyols and (meth)acrylated polyether polyols.

Preferably the radiation curable material (b) is selected from the group consisting of bisphenol A epoxyacrylate, fatty acid modified bisphenol A acrylate, aliphatic epoxy (meth) acrylate, epoxy modified oil (meth)acrylate, polyester (meth)acrylate, urethane (meth)acrylate, acrylated acrylic, silicone acrylate, IBOA, IBOMA, PEA, TMPTA, alkoxylated TMPTA, TMPTMA, HDDA, alkoxylated HDDA, HDDMA, TPGDA, PETA, alkoxylated PETA, and mixtures thereof. These are all UV curable materials.

Preferably the composition of the invention comprises 5 to 40 wt % and most preferably 6 to 35 wt % of radiation curable material (b).

Preferably the viscosity of the radiation curable material (b) is ≤200 Pa·s, more preferably ≤100 Pa·s and most preferably ≤50 Pa·s at 25° C.

The polyurethane (c) may comprise one or more than one polyurethane.

Preferably the Mw of the polyurethane (c) is in the range of from 5,000 to 65,000 g/mol and more preferably 6,000 to 55,000 g/mol.

Preferably the composition of the invention comprises 20 to 70 wt %, more preferably 20 to 65 wt % and most preferably 22 to 55 wt % of polyurethane (c).

For clarity, it is preferred that the polyurethane (c) is not radiation curable, although it may be possible for some of the higher Mw polyurethanes to have a degree of C=C double bonds that may be curable.

Preferably any polyurethane (c) with a Mw in the range of from 4,000 to 30,000 g/mol and especially any polyurethane (c) with a Mn in the range of from 1,000 to 10,000 g/mol is essentially free of C=C double bonds. By essentially free is meant 0 to 0.1 mol of C=C double bonds per 100 g of polyurethane.

Preferably the PDi of the polyurethane (c) is in the range of from 1.3 to 10, more preferably 1.3 to 6 and especially 1.6 to 3. The polydispersity index (PDi) is defined as the weight average molecular weight (Mw) divided by the number average molecular weight (Mn).

In an embodiment of the invention the polyurethane (c) has an Mp in the range of from 10,000 to 35,000 g/mol, more preferably the Mp is in the range of from 13,000 to 32,000 g/mol, most preferably 17,000 to 31,000 g/mol and especially 19,000 to 30,000 g/mol. The Mp is the molecular weight with the highest signal (i.e. the apex of the peak) in a chromatogram resulting from the measuring of the molecular weight using GPC with polystyrene as a standard and tetrahydrofuran as an eluent. Mp values are discussed in Modern Size Exclusion Liquid Chromatography, W. W. Yau, J. K. Kirkland and D. D. Bly, John Wiley & Sons, USA, 1997.

The polyurethane (c) of the invention composition preferably has a viscosity ≤18,000 mPa·s, more preferably ≤12,000 mPa·s and most preferably ≤6,000 mPa·s at any solids content in the range of from 20 to 60 wt %, in a solvent comprising ≥70 wt %, more preferably ≥90 wt % and most preferably 100 wt % of at least one solvent having a molecular weight ≤105 g/mol. All viscosities are measured according to ISO 2555-1989 at 25° C. Preferred solvents used to measure the viscosity of the polyurethane (c) in, include ethanol, isopropanol, n-propanol, ethyl acetate, propyl acetate and or mixtures thereof.

The polyurethane (c) of the invention composition is preferably obtained by the reaction of components comprising:
(i) 5 to 50 wt % of at least one polyisocyanate;
(ii) 0 to 20 wt % of at least one isocyanate-reactive component having a Mw in the range of from 50 to 200 g/mol;
(iii) 0 to 90 wt % of at least one isocyanate-reactive component having a Mw in the range of from 201 to 20,000 g/mol;

(iv) 0 to 95 wt % of at least one isocyanate-reactive component not comprised by (ii) or (iii);

(v) 0 to 40 wt % of at least one chain-extending and/or chain-terminating component not comprised by (i), (ii), (iii) or (iv);

where (i), (ii), (iii), (iv) and (v) add up to 100%;

in the presence of a solvent;

where the components comprise 0 to 5 wt % of isocyanate-reactive component(s) bearing ionic or potentially ionic water-dispersing groups.

The polyisocyanate component (i) may be an aliphatic polyisocyanate, an aromatic polyisocyanate or mixtures thereof.

The term aromatic polyisocyanate (for the sake of clarity) is intended to mean compounds in which all the isocyanate groups are directly bonded to an aromatic group, irrespective of whether aliphatic groups are also present. Examples of suitable aromatic polyisocyanates include but are not limited to p-xylene diisocyanate, 1,4-phenylene diisocyanate, 2,4-toluene diisocyanate, 2,6-toluene diisocyanate, 4,4'-methylene bis(phenyl isocyanate), polymethylene polyphenyl polyisocyanates, 2,4'-methylene bis(phenyl isocyanate) and 1,5-naphthylene diisocyanate. Preferred aromatic isocyanates include 2,4'-methylene bis(phenyl isocyanate) and 4,4'-methylene bis(phenyl isocyanate). Aromatic polyisocyanates provide chemical resistance and toughness but may yellow on exposure to UV light.

The term aliphatic polyisocyanate (for the sake of clarity) is intended to mean compounds in which all the isocyanate groups are directly bonded to aliphatic or cycloaliphatic groups, irrespective of whether aromatic groups are also present.

Examples include but are not limited to ethylene diisocyanate, para-tetra methylxylene diisocyanate (p-TMXDI), meta-tetra methylxylene diisocyanate (m-TMXDI), 1,6-hexamethylene diisocyanate, isophorone diisocyanate (IPDI), cyclohexane-1,4-diisocyanate and 4,4'-dicyclohexylmethane diisocyanate. Aliphatic polyisocyanates improve hydrolytic stability, resist UV degradation and do not yellow. Preferred aliphatic iscocyanates include isophorone diisocyanate, 4,4'-dicyclohexylmethane diisocyanate and 1,6-hexamethylene diisocyanate.

Preferably at least 70 wt %, more preferably at least 85 wt % and most preferably at least 95 wt % of the polyisocyanate in component (i) has two isocyanate groups.

Aromatic or aliphatic polyisocyanates which have been modified by the introduction of, for example, urethane, allophanate, urea, biuret, uretonimine and urethdione or isocyanurate residues may be used for component (i).

Preferably the polyurethane comprises 4 to 30 wt % and more preferably 10 to 20 wt % of component (i).

The isocyanate-reactive components (ii) to (iv) will normally consist of a polyol component bearing isocyanate-reactive groups which may also bear other reactive groups such as ionic (anionic and cationic) and non-ionic water dispersing groups. Isocyanate-reactive groups include groups such as —OH, —SH, —NH—, —NH$_2$ and —CHR$^1$—COOH where R$^1$ can be H or alkyl (more preferably C$_1$ to C$_8$ alkyl).

Examples of component (ii) include but are not limited to 1,4-cyclohexyldimethanol, ethylene glycol, propylene glycol, diethylene glycol, neopentyl glycol, 1,4-butanediol, 1,6-hexanediol, furan dimethanol, cyclohexane dimethanol, glycerol, trimethylolpropan, dimethylol propanoic acid (DMPA) and dimethylol butanoic acid (DMBA). DMPA and DMBA are examples of isocyanate-reactive components (ii) bearing anionic or potentially anionic water-dispersing groups.

Preferably component (ii) has an average of 1.8 to 2.5 isocyanate-reactive groups and more preferably component (ii) has two hydroxy functional groups.

Preferably the weight average molecular weight (Mw) of component (ii) is in the range of from 62 to 200 g/mol and more preferably 84 to 200 g/mol.

Preferably the polyurethane (c) comprises 0 to 5 wt % and more preferably 0 to 3 wt % of component (ii).

Examples of component (iii) and (iv) include but are not limited to polyols such as polypropylene glycols, poly(propylene oxide/ethylene oxide) copolymers, polytetrahydrofuran, polybutadiene, hydrogenated polybutadiene, polysiloxane, polyamide polyesters, isocyanate-reactive polyoxyethylene compounds, polyester, polyether, polycaprolactone, polythioether, polycarbonate, polyethercarbonate, polyacetal and polyolefin polyols. Generally polyester polyols provide good weathering, good adhesion, improved chemical resistance and toughness; polyether polyols provide good flexibility and elasticity; polycaprolactone polyols provide improved weathering and better heat resistance than polyether polyols and better water resistance than adipate polyester polyols.

Polyester amides may be obtained by the inclusion of amino-alcohols such as ethanolamine in polyesterification mixtures. Polyesters which incorporate carboxy groups may be used, for example polyesters where DMPA and/or DMBA are used during the synthesis.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Particularly preferred are polypropylene glycols.

Preferably the weight average molecular weight of component (iii) is in the range of from 500 to 11,000 g/mol, more preferably 600 to 6,000 g/mol and especially 700 to 5,000 g/mol.

Components (iii) and (iv) may also include crosslinking groups. Crosslinking groups are well known in the art and include groups which crosslink at ambient temperature (20±3° C.) or at elevated temperatures up to 185° C., preferably up to 160° C. by a number of mechanisms including but not limited to Schiff base crosslinking (for example the reaction of carbonyl functional groups with carbonyl reactive amine and/or hydrazine functional groups); silane crosslinking (for example the reaction of alkoxy silane groups in the presence of water), melamine crosslinking and epoxy groups crosslinking with epoxy-reactive functional groups or isocyanate curing, where hydroxy or amine (primary or secondary) functional polyurethanes are combined with polyisocyanates. Usually the polyisocyanates are added shortly before application. In a preferred embodiment, blocked polyisocyanates are used, where for example the polyurethane is blocked with a mekoxime, which deblocks at elevated temperature after application and can then react with a hydroxyl functional urethane at the elevated temperature. Isocyanate crosslinking is most preferred, when crosslinking is applied during the application process.

Preferably the polyurethane (c) comprises 20 to 90 wt % and more preferably 60 to 90 wt % and especially 70 to 90 wt % of component (iii).

Preferably the polyurethane (c) comprises 0 to 6 wt % and more preferably 0 to 3 wt % and most preferably 0 wt % of component (iv).

Preferably polyurethane (c) comprises 0 to 5 wt %, more preferably 0 to 3 wt % and especially 0 to 1.5 wt % of isocyanate reactive component(s) bearing ionic or potentially ionic water-dispersing groups. This includes components (ii), (iii), (iv) and (v).

Component (v) is a chain-extending and/or chain-terminating component.

Examples of chain-terminating components include mono-alcohols, amino-alcohols, primary or secondary amines and mono-functional hydrazines as are well known in the art. Di- or poly-functional isocyanate-reactive components may be used as a chain-terminating component if only one isocyanate -reactive group reacts under the given conditions. Examples of such difunctional components include mono-ethanol amine. The chain-terminating component may also be a mono-functional isocyanate.

Examples of chain-extending components include amino-alcohols, primary or secondary diamines or polyamines such as ethylene diamine, propylene diamine and cyclic amines such as isophorone diamine and 4,4'-dicyclohexylmethane diamine; hydrazine and substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine, bis-semi-carbazide, and bis-hydrazide carbonic esters of glycols; azines such as acetone azine, and or mixtures thereof. Another suitable class of chain-extending components are the so-called "Jeffamine" compounds with a functionality of 2 or 3 (available from Huntsman). These are PPO or PEO-based di or triamines, e.g. "Jeffamine" T403 and "Jeffamine" D-400. In a special embodiment where the prepolymer has isocyanate-reactive functional groups (such as hydroxyl groups) a chain-extending component may also be a difunctional isocyanate.

Preferably the polyurethane (c) comprises 0.2 to 40 wt %, more preferably 0.7 to 25 wt %, especially 1 to 10 wt % and most especially 3 to 6 wt % of component (v).

The polyurethane (c) of the invention composition may be prepared conventionally by reacting a stoichiometric excess of the organic polyisocyanate (component (i)) with the isocyanate-reactive components (components (ii), (iii) and (iv)) under substantially anhydrous conditions at a temperature between about 30° C. and about 130° C., more preferably about 45° C. to about 85° C. until reaction between the isocyanate groups and the isocyanate-reactive groups is substantially complete to form an isocyanate-terminated prepolymer; preferably the reactants for the prepolymer are generally used in proportions corresponding to a ratio of isocyanate groups to isocyanate-reactive groups of from about 1.2:1 to about 2:1, more preferably from about 1.3:1 to 2.0:1 and most preferably 1.45:1 to 2:1. If desired, catalysts such as dibutyltin dilaurate and stannous octoate, zirconium or titanium based catalysts may be used to assist the polyurethane formation. Optionally no catalyst is added. Preferably no tin based catalyst is added. The catalyst, if used may be added immediately to a mixture of components (i) to (iv) or the mixture of components (i) to (iv) may be allowed to react for a period of time before the addition of a catalyst.

The reaction is usually carried out in the presence of an organic solvent to control the viscosity. Suitable organic solvents include but are not limited to acetone, tetrahydrofuran, ethyl acetate, methyl ethyl ketone, methyl isobutyl ketone and other solvents well known in the art. However it is preferred that solvents containing hydroxyl-functionality, such as ethanol or isopropanol should not be used during the early stages of the polyurethane synthesis as they may have a detrimental effect on the molecular weight build up. During chain-extension, these solvents can be used, since the reaction of (di) amines with isocyanate groups is significantly faster than the reaction of isocyanate groups with hydroxyl groups.

If an isocyanate-terminated prepolymer is formed it is then reacted with a chain-extending and/or chain-terminating component (v). Preferably the reactants are used in proportions so that all isocyanate groups are reacted so that the resultant polyurethane (c) has a free isocyanate group content ≤0.5 wt %, most preferably 0.01 wt % and especially is so low that the isocyanate group content is no longer detectable using methods well known in the art. Alternately a hydroxyl-terminated prepolymer may be formed which is then reacted with a chain-extending and/or chain-terminating component (v).

The reaction between the components may be carried out in any order. According to a preferred embodiment of the present invention there is provided a composition comprising:
 (a) 15 to 85 wt % of at least one solvent comprising ≤1 wt % of water;
 (b) 5 to 50 wt % of at least one radiation curable material:
  (i) having a Mn in the range of from 550 to 3500 g/mol;
  (ii) having an average acrylate function in the range of from 2 to 5;
 (c) 10 to 70 wt % of at least one polyurethane:
  (i) having a Mw in the range of from 6,000 to 55,000 g/mol;
  (ii) having 0 to 5 wt % of isocyanate-reactive component(s) bearing ionic or potentially ionic water-dispersing groups;
  (iii) having a non-detectable free isocyanate group content;
  (iv) having 0 to 0.1 mol of C=C bonds per 100 g; and
 wherein (a), (b) and (c) add up to 100%;
where the ratio of (b) to (c) is in the range of from 14/86 to 35/65.

Preferably the composition of the invention has a solids content in the range of from 25 to 85 wt % and more preferably 40 to 85 wt % and most preferably 45 to 75 wt %.

Preferably the composition of the invention has a resolubility within 30 seconds, more preferably within 20 seconds and most preferably within 10 seconds.

The resultant composition may be used directly as a binder for inks or in combination with, for example, defoamers, anti-oxidants, corrosion inhibitors, bacteriocides, anti-settling agents, dispersing agents, fillers, waxes, thickeners, co-resins and/or colorants.

In an embodiment of the present invention there is provided an adhesive, more preferably a laminating adhesive, comprising a composition according to the invention.

In a further embodiment of the present invention there is provided an ink comprising the composition according to the invention and additionally a colorant (d).

The ink preferably has a viscosity in the range of from 50 to 1,000 mPa·s and more preferably 100 to 500 mPa·s at 20° C.

Preferably the ink comprises 0.1 to 50 wt %, more preferably 3 to 40 wt % and most preferably 8 to 40 wt % of (d), the colorant.

Colorants include dyes, pigments or mixtures thereof. The pigment may be any conventional organic or inorganic pigment such as titanium dioxide, carbon black or any coloured pigments well known in the art.

The dyes may be any conventional dyes selected from acid dyes, natural dyes, cationic or anionic direct dyes, basic dyes and reactive dyes.

Optionally the ink may also contain other ingredients used in inks, for example defoamers, anti-oxidants, corrosion inhibitors, bacteriocides and viscosity modifiers.

Preferably the ink comprises ≤10 wt % of water, more preferably ≤6 wt % and most preferably ≤1 wt % of water.

According to another preferred embodiment of the present invention there is provided a ink comprising:
(a) 15 to 84 wt % of at least one solvent comprising ≤20 wt % of water;
(b) 5 to 50 wt % of at least one radiation curable material having a Mn in the range of from 50 to 10,000 g/mol;
(c) 10 to 70 wt % of at least one polyurethane:
  (i) having a Mw in the range of from 4,000 to 70,000 g/mol;
  (ii) having 0 to 5 wt % of isocyanate-reactive component(s) bearing ionic or potentially ionic water-dispersing groups;
  (iii) having a free isocyanate group content ≤0.5 wt %; and
(d) 0.1 to 50 wt % of at least one colorant;
wherein (a), (b), (c) and (d) add up to 100%; and
where the ratio of (b) to (c) is in the range of from 9/91 to 40/60.

The ink may be used in a number of printing processes including screen printing, flexographic and/or gravure printing processes. Preferably the printing process is a flexographic and/or gravure printing process.

In a further embodiment of the present invention there is provided a process for printing an image on a substrate comprising applying thereto an ink containing a composition according to the present invention.

The invention will now be described by example only. All parts and percentages are by weight unless specified otherwise.

COMPONENTS USED

NeoRez U-347=available from DSM NeoResins BV, is a non-reactive aromatic polyurethane with an average molecular weight of Mn=3500 g/mol and Mw=8,500 g/mol and a solids content of 75% (volatiles: 22.5% ethyl acetate, 2.5% ethanol). Viscosity Brookfield (25° C.): 1100 mPa·s. The Mp is 4,800 and the PDi is 2.43. The wt % of isocyanate reactive components bearing ionic or potentially ionic water dispersion groups used to make NeoRez U-347 was 0%. There was no detectable isocyanate group content. The level of C═C bonds per 100 g was 0 mol.

NeoRez U-335=available from DSM NeoResins BV, is a non-reactive semi-aliphatic polyurethane with an average molecular weight of Mn=20,000 g/mol and Mw=53,000 g/mol and a solids content of 45% (volatiles: 12.5% ethyl acetate, 42.5% ethanol). Viscosity Brookfield (25° C.): 3,100 mPa·s. The Mp is 50,000 and the PDi is 2.65. The wt % of isocyanate reactive components bearing ionic or potentially ionic water dispersion groups used to make NeoRez U-335 was 0%. There was no detectable isocyanate group content. The level of C═C bonds per 100 g was 0 mol.

Craynor CN104=available from Cray Valley, is a bisphenol A epoxyacrylate (100%). Average molecular weight Mn=900 g/mol and the viscosity is 18 Pa·s at 50° C. and the functionality is 2.

Ebecryl 8210=available from Cytec Surface Specialties, is an aliphatic acrylated polyurethane (100%). Average molecular weight Mn=600 g/mol and the viscosity is 4,500 mPa·s at 25° C. and the functionality is 4.

Ebecryl 810=available from Cytec Surface Specialties, is a polyester acrylate (100%). Average molecular weight Mn=1000 g/mol and the viscosity is 500 mPa·s at 25° C. and the functionality is 4.

Esacure KIP100F=Photoinitiator (100%) is available from Lamberti.

Irgacure 819=Photoinitiator (100%) is available from Ciba.

EtAc=Ethyl acetate

EtOH=Ethanol

Solsperse 20000=surfactant available from Noveon

Solsperse 12000=surfactant available from Noveon

Nitrocellulose 3.5 DLX=available from ICI

Sunfast Blue=pigment available from Sun Chemical

Compositions (Non-pigmented)

Compositions of the invention (Examples 2, 3, 5, and 6) and comparative compositions (Comparative examples C1 and C4) were prepared by mixing the components as shown below in Table 1.

TABLE 1

| Example | C1 | 2 | 3 | C4 | 5 | 6 |
|---|---|---|---|---|---|---|
| Components (wt %) | | | | | | |
| NeoRez U-347 | 60 | 48.4 | 48.4 | 0 | 0 | 0 |
| NeoRez U-335 | 0 | 0 | 0 | 100 | 80.6 | 80.6 |
| Craynor CN104 | 0 | 15.5 | 0 | 0 | 15.5 | 0 |
| Ebecryl 8210 | 0 | 0 | 15.5 | 0 | 0 | 15.5 |
| Esacure KIP 100F (40% in IPA) | 0 | 3.9 | 3.9 | 0 | 3.9 | 3.9 |
| Ethyl acetate/ ethanol (3/1 wt) | 40 | 32.2 | 32.2 | 0 | 0 | 0 |
| Total | 100 | 100 | 100 | 100 | 100 | 100 |
| Solids % | 45 | 51.8 | 51.8 | 45 | 51.8 | 51.8 |

Inks (pigmented)

Inks comprising compositions of the invention and comparative compositions were prepared by mixing the components as shown below in Table 2.

TABLE 2

| Example | C7 | 8 | 9 | C10 | 11 | 12 | 13 |
|---|---|---|---|---|---|---|---|
| Composition components (wt %) | | | | | | | |
| NeoRez U-347 | 60 | 43.4 | 43.4 | 0 | 0 | 0 | 0 |
| NeoRez U-335 | 0 | 0 | 0 | 38 | 27.5 | 27.5 | 34.4 |
| Craynor CN104 | 0 | 13.8 | 0 | 0 | 5.3 | 0 | 0 |
| Ebecryl 8210 | 0 | 0 | 13.8 | 0 | 0 | 5.3 | 0 |
| Ebecryl 810 | 0 | 0 | 0 | 0 | 0 | 0 | 6.6 |
| Irgacure 819 (10% in EtAc/EtOH) | 0 | 13.8 | 13.8 | 0 | 5.3 | 5.3 | 6.6 |
| EtAc/EtOH (3/1 wt) | 40 | 29 | 29 | 62 | 61.9 | 61.9 | 52.4 |
| Total | 100 | 100 | 100 | 100 | 100 | 100 | 100 |
| Viscosity mPa·s | 35 | 29 | 26 | 36 | 21 | 21 | 34 |
| Ink components (wt %) | | | | | | | |
| Composition | 70 | 70 | 70 | 70 | 70 | 70 | 70 |
| Nitrocellulose blue paste | 30 | 30 | 30 | 30 | 30 | 30 | 30 |
| Total | 100 | 100 | 100 | 100 | 100 | 100 | 100 |
| Solids level % | 40.0 | 41.8 | 41.8 | 20.4 | 21.1 | 21.1 | 24.5 |
| Viscosity mPa·s | 38 | 33 | 30 | 40 | 30 | 30 | 40 |

* Nitrocellulose blue paste (parts by weight) = EtAc (55.9%), EtOH (15.9%), Solsperse 20000 (2.2%), Solsperse 12000 (0.4%), Nitrocellulose 3.5 DLX (8.0%), Sunfast Blue (17.6%) Final solids content 28%.

Examples C1 to 6 were further diluted with ethyl acetate/ ethanol (3/1) to attain a viscosity level of about 20 to 50 mPa·s. Examples C1 to 6 and inks C7 to 12 were then applied on various substrates (cardboard, PET, PE-white, MB-400) using a 12 micron wire rod. Directly after application the wet films were dried for 10 seconds at 80° C.

The UV curable material containing examples (2, 3, 5, 6, 8, 9, 11, 12) were subsequently cured by UV radiation using the following conditions: 2×200 mJ/cm$^2$ at 240 nm for the non-pigmented examples (2, 3, 5, 6) and 2×300 mJ/cm$^2$ at 420 nm for the blue ink examples (8, 9, 11, 12).

All of the obtained films were examined for gloss, adhesion, block resistance, chemical resistances, dry wrinkle, wet wrinkle and resolubility. Test results are given below in Table 3 and 4.

Dry wrinkle test

A 12 μm thick wet film formulation was cast onto Corona treated white polyethylene (LDPE) film available from Oerlemans Plastics BV (Genderen, N L). This was dried for 10 seconds at 80° C. and then at least one day (to maximum of five days) at room temperature (20 to 25° C.). The dried film is folded for at least five times (in a concertina fashion) and wrinkled for 10 seconds. The sensitivity towards dry wrinkle is assessed by determining the degree of coating damage (5=very good: coating is undamaged; 1=very poor: formulation is completely removed).

Wet wrinkle test

The wet wrinkle test proceeds according the dry wrinkle test, only that in this case the dried film is placed for 20 minutes in a beaker filled with cold water, after which the wrinkle test is immediately performed. The wrinkling is performed for 10 seconds under cold water.

Resolubility

The composition of the invention or the formulated ink was cast onto a test card and dried for 1 hour at room temperature. A drop of the same ink formulation was put on the dried film. After a period of time (e.g. 5 seconds), the drop was removed with a wet tissue. This period of time was then increased until the dried film was completely redissolved by the drop i.e. resolubility of the formulation had occurred and the time needed to completely resolubilise the formulation was measured.

Block resistance

The degree of blocking of a coating against the same coating (lacquer to lacquer or L/L blocking) or lacquer to backside of the substrate (L/B) was assessed with a Koehler Block tester (ex Instrument Company Inc.). The blocking resistance of dried films (10 seconds at 80° C.) is measured after 16 hrs in an oven at 52° C. under a pressure of 1 kg/cm$^2$. Printed substrates (with a 12 μm wet coating of the composition of the invention) were cut into small pieces of 30×100 mm and folded twice so that lacquer against lacquer and lacquer against substrate backside was tested. The degree of blocking was determined on the ease of pulling the two test specimens apart and assessing the coating for any damage. (5 very good=entirely separated and undamaged. 4=fair, some sticking, hardly any damage. 3=mediocre. 2=poor. 1=very poor, stuck together; once pulled apart, they are both completely damaged.)

Adhesion

A self adhesive tape (Sellotape™ 25 mm from Henkel Consumer Adhesives or Scotch™ tape 20 mm from 3M) was applied under uniform pressure onto a printed ink layer on a substrate immediately after drying of the layer and torn off the substrate immediately thereafter. The quantity of the print adhered to the tape was classified with a scale from 0 to 5, where 0 means more than 95% of the printed layer adhered to the tape, 1 means more than 50% of the layer adhered to the tape, 2 means less than 30%, of the printed layer adhered to the tape, 3 means less than 20% of the printed layer adhered to the tape, 4 means less than 10% of the printed layer adhered to the tape and 5 means less than 2% of the printed film adhered to the tape.

Substrates that may be used for this test are:

MB 400, co-extruded bioriented polypropylene (Mobil)

PET foil PASD 0.10 mm (from SIHL Benelux)

PE-white (LDPE, from Oerlemans Plastics BV, Genderen N L), which was corona treated with a Vetaphone ET-1, 300 W at 15 m/min and about 2 mm distance between the substrate and the corona-treater.

Chemical resistance test

A 12 μm thick wet film formulation was cast onto a Leneta test card and dried for 10 seconds at 80° C. and then for at least 2 hours at approximately 20° C. A small piece of cotton wool was placed on the dried film, which was then soaked with the test liquid, such as demineralised water, alcohol/water (30/70) mixture, coffee or squalane. The soaked pieces of cotton wool were then covered by a petri-dish to prevent drying out. After 16 hours the pieces of cotton wool and residual liquid were removed and the degree of coating damage was determined (5=very good: no visible damage or degradation/discoloration; 4=only slight visible damage or haze/blooming; 3=clear haze/blooming or damage; 2=coating partially dissolved; 1=very poor: coating is (almost) completely dissolved).

Gloss

A 12 μm thick wet film formulation was cast onto a Leneta test card and dried for 10 seconds at 80° C. and then for at least a 2 hours at approximately 20° C. The gloss level of the dried film was determined using a Byk Gardner micro-TRI-gloss device set at an angle of 20 degrees or 60 degrees.

TABLE 3

| Example | C1 | 2 | 3 | C4 | 5 | 6 |
|---|---|---|---|---|---|---|
| Gloss | | | | | | |
| 20° | 40 | 60 | 71 | 60 | 54 | 47 |
| 60° | 81 | 90 | 92 | 87 | 90 | 85 |
| Adhesion (Sellotape ™ 25 mm*/Scotch ™ tape 20 mm) | | | | | | |
| PE-white | 1/1 | 5/5 | 5/5 | 4/1 | 5/5 | 5/5 |
| MB 400 (*) | 1 | 5 | 5 | 4 | 5 | 5 |
| PET | 1/1 | 5/5 | 5/5 | 4/1 | 5/5 | 5/5 |
| Block resistance | | | | | | |
| PE-white (L-B/L-L) | 1/1 | 4/3 | 4/4 | 1/1 | 4/4 | 4/4 |
| MB-400 (L-B/L-L) | 1/1 | 4/2 | 4/4 | 1/1 | 4/2 | 4/1 |
| Chemical resistances | | | | | | |
| Demineralised water | 1 | 5 | 5 | 3 | 5 | 4-5 |
| Squalane | 1 | 5 | 5 | 5 | 5 | 5 |
| Butter | 1 | 5 | 5 | 2 | 5 | 4-5 |
| Dry wrinkle (PE-white) | 1 | 5 | 5 | 1 | 5 | 5 |
| Wet wrinkle (PE-white) | 1 | 5 | 5 | 1 | 5 | 5 |

TABLE 4

|  | C7 | 8 | 9 | C10 | 11 | 12 |
|---|---|---|---|---|---|---|
| Gloss | | | | | | |
| 20° | 37 | 40 | 43 | 19 | 16 | 15 |
| 60° | 75 | 81 | 82 | 60 | 61 | 59 |
| Adhesion (Sellotape ™ 25 mm*/Scotch ™ tape 20 mm) | | | | | | |
| PE-white | 2/2 | 5/5 | 5/5 | 5/2 | 5/5 | 5/5 |
| MB 400 (*) | 2 | 5 | 5 | 5 | 5 | 5 |
| PET | 2/2 | 5/5 | 5/5 | 5/2 | 5/5 | 5/5 |
| Block resistance | | | | | | |
| PE-white (L-B/L-L) | 1/1 | 4/4 | 4/4 | 4/1 | 5/4 | 5/4 |
| MB-400 (L-B/L-L) | 1/1 | 5/3 | 5/2 | 4/1 | 5/4 | 5/3-4 |
| Chemical resistances | | | | | | |
| Demineralised water | 2 | 4 | 4 | 3 | 3 | 3 |
| Ethanol/water (30/70) | 2 | 5 | 4 | 2 | 2 | 2 |
| Squalane | 4 | 5 | 5 | 5 | 5 | 4-5 |
| Butter | 3 | 4-5 | 4 | 4 | 4 | 4 |
| Dry wrinkle (PE white) | 1 | 3-4 | 4 | 2-3 | 4-5 | 4-5 |
| Wet wrinkle (PE white) | 1 | 2-3 | 3-4 | 1 | 2-3 | 2-3 |
| Resolubility (s) | <5 | <5 | <5 | <5 | <5 | <5 |

Printability

Printability properties were determined with a K-control coater type K-101 with an anilox application device. The printability of the ink was determined by assessing the rheology of the applied dry ink layer (ink flow behaviour and ink layer appearance), wetting behaviours on the selected substrate and ink transfer from the anilox onto the rubber roller which was used to print the ink onto the substrate.

The overall printability on a clean polyethylene film was determined using a scale from 0 to 5, with 5 being the best result. The results are shown below in Table 5 below.

Cob webbing

Using a pipette five drops of blue ink compositions prepared as described above were put onto clean polyethylene film. The drops were cast immediately with a flexographic hand roller which was rolled 5 times (up and down), under a spot suction. The cob webbing tendency was observed during the application.

After 5 minutes, the appearance of the ink applied onto the polyethylene film was judged with respect the amount of ink which is removed from the substrate, indicating different evolution of tack among the versions. The results are shown below in Table 5.

The scale used was 0 to 5, with 5 being the best result.

TABLE 5

| | Example | | | | |
|---|---|---|---|---|---|
| | C7 | 8 | 9 | C10 | 13 |
| Printability | 5 | 5 | 5 | 5 | 5 |
| Cob webbing | 5 | 5 | 5 | 3 | 4 |

An advantage of the composition of the invention when compared with the poyurethane component on its own is that higher solids levels are attainable, this is shown below in Table 6. The blends were diluted with EtAc/EtOH (3/1) to attain the required viscosities.

TABLE 6

| | Example | | | |
|---|---|---|---|---|
| | C14 | 15 | C16 | 17 |
| Components (wt %) | | | | |
| NeoRez U-347 | 100 | 70 | 0 | 0 |
| NeoRez U-335 | 0 | 0 | 100 | 70 |
| Ebecryl 810 | 0 | 30 | 0 | 30 |
| Total | 100 | 100 | 100 | 100 |
| Solids level (wt %) at a given viscosity (25° C.) | | | | |
| 100 mPa · s | 55 | 64 | 23 | 30 |
| 250 mPa · s | 63 | 72 | 29 | 37 |
| 500 mPa · s | 68 | 75 | 34 | 43 |
| 1000 mPa · s | 73 | 80 | 38 | 47 |

The invention claimed is:

1. A radiation curable composition comprising:
    (a) 15 to 85 wt % of at least one solvent comprising ≤20 wt % of water;
    (b) 5 to 50 wt % of at least one radiation curable material having a Mn in the range of from 50 to 10,000 g/mol and an average acrylate functionality in the range of from 2 to 6;
    (c) 10 to 70 wt % of at least one polyurethane having
        (i) a Mw in the range of from 4,000 to 70,000 g/mol;
        (ii) 0 to 1.5 wt % of isocyanate-reactive component(s) bearing ionic or potentially ionic water-dispersing groups; and
        (iii) a free isocyanate group content <0.5 wt %;
    wherein the at least one solvent (a) comprises ≥74 wt. % solvents having an evaporation rate ≥1.0 in relation to butyl acetate having an evaporation rate of 1.0; and
    wherein the composition has solids content of 25 to 85 wt. %; and
    wherein (a), (b) and (c) add up to 100%; and
    wherein the ratio of (b) to (c) is in the range of from 9/91 to 40/60.

2. A composition according to claim 1 wherein the radiation curable material (b) is a UV curable material.

3. A composition according to claim 1 wherein the polyurethane (c) has a viscosity ≤18,000 mPa s at any solids content in the range of from 20 to 60 wt %, in a solvent comprising ≥70 wt % of at least one solvent having a molecular weight ≤105 g/mol.

4. A composition according to claim 1 comprising:
    (a) 15 to 85 wt % of at least one solvent comprising ≤1 wt % of water;
    (b) 5 to 50 wt % of at least one radiation curable material having:
        (i) a Mn in the range of from 550 to 3500 g/mol; and
        (ii) an average acrylate function in the range of from 2 to 5;
    (c) 10 to 70 wt % of at least one polyurethane having:
        (i) a Mw in the range of from 6,000 to 55,000 glmol;
        (ii) 0 to 1.5 wt % of isocyanate-reactive component(s) bearing ionic or potentially ionic water-dispersing groups;
        (v) a non-detectable free isocyanate group content; and
        (vi) 0 to 0.1 mol of CC bonds per 100 g; and
    wherein (a), (b) and (c) add up to 100%; where the ratio of (b) to (c) is in the range of from 14/86 to 35/65.

5. A composition according to claim 1 wherein the polyurethane is obtained by the reaction of components:
(i) 5 to 50 wt % of at least one polyisocyanate;
(ii) 0 to 20 wt % of at least one isocyanate-reactive component having a Mw in the range of from 50 to 200 g/mol;
(iii) 0 to 90 wt % of at least one isocyanate-reactive component having a Mw in the range of from 201 to 20,000 g/mol;
(iv) 0 to 95 wt % of at least one isocyanate-reactive component not comprised by (ii) or (iii); and
(v) 0 to 40 wt % of at least one chain-extending and/or chain-terminating component not comprised by (i), (ii), (iii) or (iv);
wherein (i), (ii), (iii),(iv) and (v) add up to 100%; in the presence of a solvent; and
wherein the components comprise 0 to 1.5 wt % of isocyanate-reactive component(s) bearing ionic or potentially ionic water-dispersing groups.

6. A composition according to claim 1 having a resolubility within 30 seconds.

7. An adhesive comprising a composition according to claim 1.

8. An ink comprising:
(a) 15 to 84 wt % of at least one solvent comprising ≤20 wt % of water;
(b) 5 to 50 wt % of at least one radiation curable material having an Mn in the range of from 50 to 10,000 g/mol and an average acrylate functionality in the range of from 2 to 6;
(c) 10 to 70 wt % of at least one polyurethane:
  (i) having a Mw in the range of from 4,000 to 70,000 g/mol;
  (ii) having 0 to 1.5 wt % of isocyanate-reactive component(s) bearing ionic or potentially ionic water-dispersing groups; having a free isocyanate group content 0.5 wt %; and
(d) 0.1 to 50 wt % of at least one colorant;
wherein (a), (b), (c) and (d) add up to 100%; and
wherein the at least one solvent (a) comprises ≥74 wt. % solvents having an evaporation rate ≥1.0 in relation to butyl acetate having an evaporation rate of 1.0; and
wherein the composition has solids content of 25 to 85 wt. %; and
wherein the ratio of (b) to (c) is in the range of from 9/91 to 40/60.

9. An ink according to claim 8 comprising ≤10 wt % of water.

10. An ink according to claim 8 having a viscosity in the range of from 50 to 1,000 mPa s.

11. A process for printing an image on a substrate comprising applying thereto an ink according to claim 8.

12. A flexographic printing process comprising applying an ink according to claim 8 to a substrate.

13. A gravure printing process comprising applying an ink according to claim 8 to a substrate.

14. A gravure printing process comprising applying an ink according to claim 9 to a substrate.

* * * * *